(12) United States Patent
Miller

(10) Patent No.: US 7,739,969 B1
(45) Date of Patent: Jun. 22, 2010

(54) SIDE DRESSING SHIELD

(76) Inventor: John A. Miller, 10916 Catlin-Homer Rd., Catlin, IL (US) 61817

( * ) Notice: Subject to any disclaimer, the term of this patent is extended or adjusted under 35 U.S.C. 154(b) by 0 days.

(21) Appl. No.: 12/317,914

(22) Filed: Dec. 30, 2008

Related U.S. Application Data

(60) Provisional application No. 61/010,010, filed on Jan. 3, 2008.

(51) Int. Cl.
*A01C 23/00* (2006.01)
(52) U.S. Cl. .................. 111/119; 111/123; 111/900
(58) Field of Classification Search .................. 111/900, 111/118–127, 149–170, 189
See application file for complete search history.

(56) References Cited

U.S. PATENT DOCUMENTS 4,538,532 A * 9/1985 Coker .......................... 111/121

* cited by examiner

*Primary Examiner*—Christopher J. Novosad
(74) *Attorney, Agent, or Firm*—Philip L. Bateman

(57) ABSTRACT

An ammonia knife assembly is mounted onto a toolbar and is moved across a field to apply ammonia into the bottom of a trench. The ammonia knife assembly includes a knife for piercing the ground and creating the trench, an ammonia supply tube, and a horizontal shield attached to the knife. The shield has a rounded portion extending forwardly from the leading edge and two side portions extending outwardly from the sides of the knife for deflecting any dirt particles that may be thrown upwardly and outwardly from the leading edge of the knife as it pierces the ground.

8 Claims, 4 Drawing Sheets

SIDE DRESSING SHIELD

CROSS-REFERENCE TO RELATED APPLICATION

This application claims the benefit of U.S. Provisional Application Ser. No. 61/010,010, Jan. 3, 2008.

FIELD OF THE INVENTION

This invention relates to farming. More particularly, this invention relates to the application of a fertilizer.

BACKGROUND OF THE INVENTION

Plants require the element nitrogen for growth. Plants obtain nitrogen by absorbing it from the soil through their roots. A variety of nitrogen-containing compounds are commonly added to the soil as fertilizers to improve plant growth.

Corn is the most important crop grown in the United States. Corn is also known as maize and has the scientific name *Zea mays*. Corn has a growing season of about four to six months. Corn requires a relatively large amount of nitrogen, especially in the period of about twenty to eighty days after germination.

Nitrogen is commonly added to corn fields in the form of anhydrous (water free) ammonia, the chemical symbol of which is $NH_3$. The use of ammonia fertilizer is the least expensive way of adding a desired quantity of nitrogen to a corn field. Ammonia is a gas at atmospheric pressure and ambient temperatures, but is typically stored and transported in the liquid phase in pressurized containers. The liquid ammonia changes to gas upon release into atmospheric pressure.

Ammonia is generally applied to a corn field by dragging a wheeled ammonia tank and a wheeled applicator (commonly known as a toolbar) behind a tractor. Attached to the toolbar are a number of knives that create parallel trenches (also known as furrows) in the field. Supply lines run from the ammonia tank to outlets at the bottom of each knife. Ammonia is discharged into the bottom of each trench and the trench is then immediately filled by the action of disc sealers, two of which trail behind each knife. The dirt pushed back into the trench prevents excessive amounts of ammonia gas from escaping before it can dissolve in the water present in the soil.

Ammonia is added to corn fields at various times during the growing season. It is sometimes added before planting, but nitrogen levels decrease over time. Therefore, to achieve a desired level of nitrogen in the soil during the critical period of corn plant growth, application during the critical period requires the least amount of ammonia. The corn plants are typically a few inches tall at the beginning of the critical period. When ammonia is added at this time, it is applied to the space between adjacent rows of corn plants. Application of ammonia when the corn plants are growing is commonly known as "side dressing."

One disadvantage of side dressing is that the young corn plants are easily damaged. Damage can occur both directly and indirectly. If the ammonia toolbar is not dragged precisely through field (i.e., so that the knives, wheels, and/or trailing disc sealers travel in the space between the rows of corn plants), the knives, wheels, and/or trailing disc sealers can directly damage the plants. The second, indirect way damage occurs is by the action of dirt particles that are thrown upward and outward as the knives pierce the soil. The term "dirt particles" is used herein to refer to dirt particles of all sizes. To reduce the damage, ammonia application equipment is typically pulled through the fields at a relatively low speed. The low speed reduces the area that can be fertilized in a given amount of time and increases the cost.

A variety of horizontal shields that are attached to plows and knives have been disclosed. Some shields are designed and intended to travel along the surface. For example, Harryman, U.S. Pat. No. 970,818, Sep. 20, 1910, discloses a plow with an attached horizontal shield. The shield is dragged along the surface of the ground to control the depth at which the plow extends into the ground. As another example, Bruce, U.S. Pat. No. 5,452,673, Sep. 26, 1995, discloses an ammonia knife with a trailing attached plate. The plate drags along behind the knife and closes the trench, thereby replacing the conventional disc sealers. The Harryman shield is not suitable for use with wet soil because a build-up of material occurs. The Bruce shield has no effect on the dirt particles that are thrown upward and outward from the leading edge of the knife.

Other horizontal shields are designed and intended to travel below the surface. Brannan, U.S. Pat. No. 3,605,657, Sep. 20, 1971, discloses an ammonia knife having two angled moldboards that are below ground level during use. The purpose of the moldboards is to direct dirt onto the applied ammonia and to immediately provide a seal. Thompson et al., U.S. Pat. No. 5,520,125, May 28, 1996, discloses an earthworking sweep that follows a chemical applicator. The sweep is below ground level during use and is intended to direct dirt onto the applied chemical. Dietrich, Sr., U.S. Pat. No. 6,397,767, Jun. 4, 2002, discloses a liquid fertilizer knife having horizontal wedge members. The wedge members are below ground level during use and are intended to direct dirt onto the applied fertilizer. The Brannan, Thompson et al., and Dietrich, Sr. horizontal members have no effect on the dirt particles that are thrown upward and outward from the leading edges of the knives.

Accordingly, a demand exists for a side dressing shield for an ammonia knife that prevents thrown dirt particles from damaging adjacent corn plants. A demand also exists for a method of side dressing corn that reduces the indirect damage to the corn plants caused by thrown dirt particles.

SUMMARY OF THE INVENTION

One general object of this invention is to provide an improved ammonia knife assembly containing a shield for dirt particles. A second general object of this invention is to provide a method of side dressing ammonia without causing dirt clod damage to corn plants.

I have invented an ammonia knife assembly for mounting onto a toolbar that is adapted for moving across ground having a level in a field and for applying ammonia into a bottom of a trench. The assembly comprises: (a) a substantially vertical knife for piercing ground and creating a trench as the knife is pulled across the ground, the knife having a leading edge, a trailing edge, and two sides, the knife further having a midpoint that moves at ground level during use, a forwardly projecting portion below the midpoint that moves below ground level during use, and a mounting portion above the midpoint that moves above ground level during use; (b) an ammonia supply tube attached to the knife, the tube having an outlet at the trailing edge of the curving portion of the knife for applying ammonia at the bottom of the trench created by the knife; and (c) a substantially horizontal shield attached to the knife, the shield positioned about two to twelve inches above the midpoint of the knife, the shield having a rounded portion extending forwardly from the leading edge and two side portions extending outwardly from the sides of the knife for deflecting any dirt particles that may be thrown upwardly and outwardly from the leading edge of the knife as it pierces the ground.

I have also invented a method of side dressing a corn field with ammonia without causing dirt clod damage to the corn plants. The method comprises dragging a toolbar through the field, the toolbar having a plurality of ammonia knife assemblies, each of which comprises: (a) a substantially vertical knife for piercing ground and creating a trench as the knife is pulled along the ground, the knife having a leading edge, a trailing edge, and two sides, the knife further having a midpoint adapted for moving at ground level during use, a forwardly curving portion below the midpoint adapted for moving below ground level during use, and a mounting portion above the midpoint adapted for moving above ground level during use; (b) an ammonia supply tube attached to the knife, the tube having an outlet at the trailing edge of the curving portion of the knife for supplying ammonia at the bottom of the trench created by the knife; and (c) a substantially horizontal shield attached to the knife, the shield positioned about two to twelve inches above the midpoint of the knife, the shield having a rounded portion extending forwardly from the leading edge and two side portions extending outwardly from the sides of the knife for deflecting any dirt particles that may be thrown upwardly and outwardly from the leading edge of the knife as it pierces the ground.

The ammonia knife assembly of this invention contains a shield that deflects any dirt particles that may be thrown upwardly and outwardly from the leading edge of the knife as it pierces the ground. Deflecting the dirt particles reduces the damage caused to the corn plants.

DETAILED DESCRIPTION OF THE INVENTION

Figure 1:
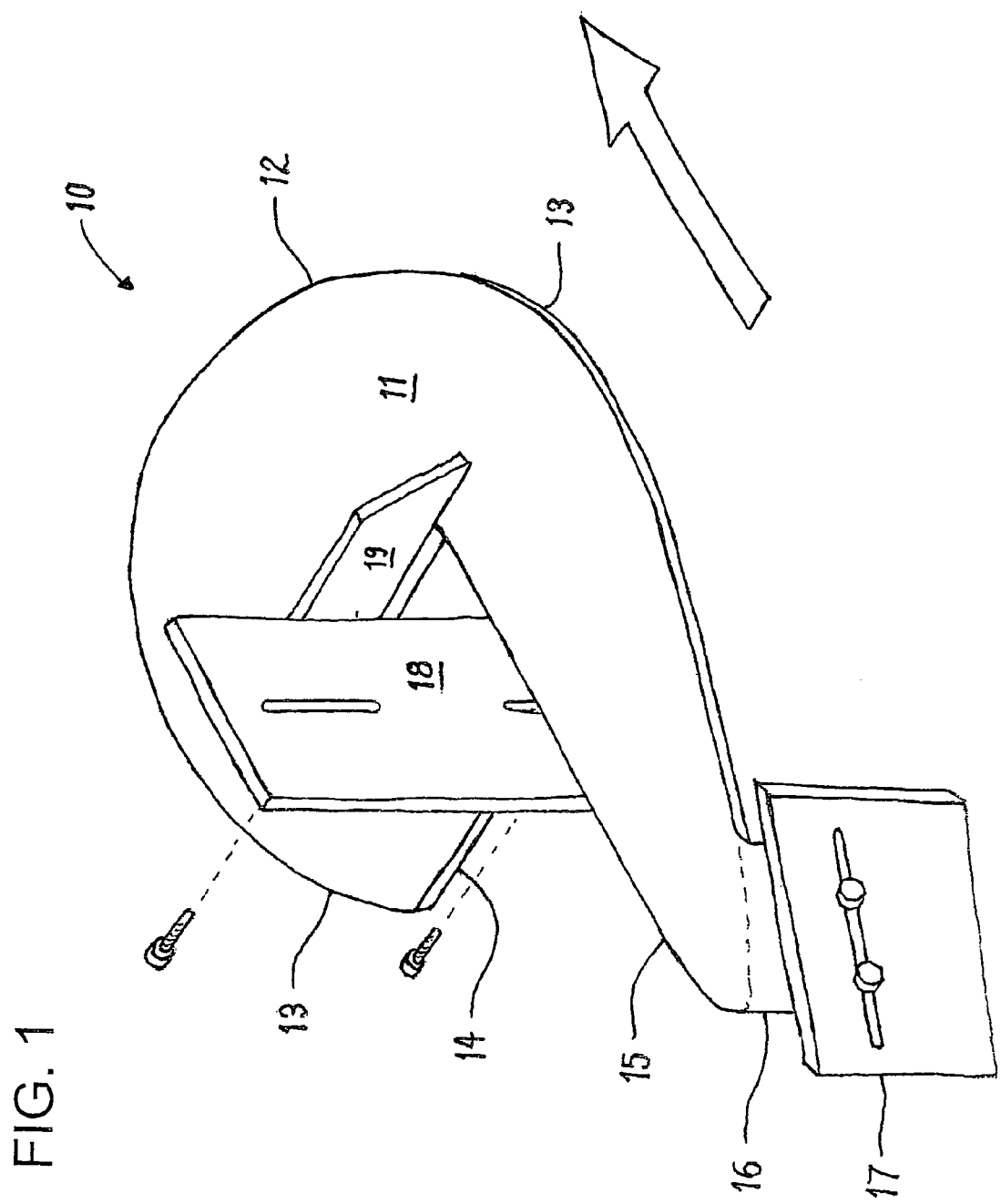
FIG. 1 is a top and rear perspective view of a preferred embodiment of the side dressing shield of this invention.

This invention is best understood by reference to the drawings. Referring to FIG. 1, a first and preferred embodiment of the side dressing shield 10 is shown prior to attachment to an ammonia knife. The large arrow shows the direction in which the shield travels through a field when in use.

The shield includes a substantially flat plate 11 that is oriented horizontally when used. The primary purpose of the shield is to deflect dirt particles that are thrown upward and outward during the side dressing of a corn field. Deflecting the dirt particles prevents them from contacting and damaging the corn plants.

The shield is preferably rounded at its front 12 (i.e., it is outwardly curved along its leading edge) and preferably tapers inwardly from front to back along the sides 13. This shape conforms to the typical pattern of thrown dirt particles from the leading edge of an ammonia knife. The rounded front also reduces damage to the corn plants if the driver of the tractor veers to the side and the shield hits the corn plants. It can be appreciated that a rounded edge is more likely to bend the corn plants to the side rather than breaking them.

The shield generally extends forwardly from the knife a distance of about three to seven inches, preferably about five inches. The width of the shield at its widest point is generally about six to fourteen inches, preferably about ten inches. If the shield extends less than about three inches or has a width less than about six inches, an excessive number of dirt particles may be thrown upward and not be deflected, especially at higher speeds. Extending the shield beyond about seven inches or the width to more than fourteen inches provides little, if any, additional deflection, but adds to the weight and cost of the shield.

Very little dirt is thrown upward behind the knife. Accordingly, the shield does not need to extend behind the knife to serve its purpose of dirt clod deflection. In the preferred embodiment, one side of the shield has a trailing edge 14 that terminates at about the rear edge of the knife.

The preferred embodiment of the shield contains a closing wing 15 that extends behind one side of the knife. The closing wing guides dirt along the trench back into the trench, thus providing an additional function to the shield. One portion of the closing wing is an extension of the plate that extends backwardly behind the knife. The closing wing includes a vertical bracket 16 to which a moldboard 17 is attached. The moldboard is substantially vertical and is oriented inwardly at a slight angle to the direction of travel so that it sweeps the dirt along one side of the trench back into the trench.

The addition of a closing wing including its attached moldboard to the shield eliminates the need for conventional disc sealers. Eliminating the disc sealers reduces initial costs and maintenance costs. Eliminating the disc sealers also eliminates the damage caused to the corn plants by the disc sealers if the tractor veers to the side.

The moldboard of the preferred embodiment is a rectangular plate. While this shape effectively sweeps dirt, field debris may get trapped on its leading surface. Accordingly, rounded leading surfaces or a rotating wheel are sometimes preferable as the moldboard for use in fields containing large amounts of debris.

The shield is made of a durable weatherproof material. The shield is preferably made of steel. The preferred embodiment of the shield is made of one-quarter to three-eighths inch common steel plate (for example, HC-7 steel). The moldboard of the optional closing wing is also made of a durable waterproof material. The moldboard is also preferably made of steel, but can be made of high density polyethylene or other durable plastic.

The shield preferably includes a vertical slotted flange 18 for mounting onto an ammonia knife. The gap between the vertical flange and the opposing side of the shield is sufficient to accommodate the ammonia knife. The gap is preferably about two to three inches. The shield preferably contains a vertical reinforcing gusset 19 that butts against the front of the ammonia knife.

Figure 2:
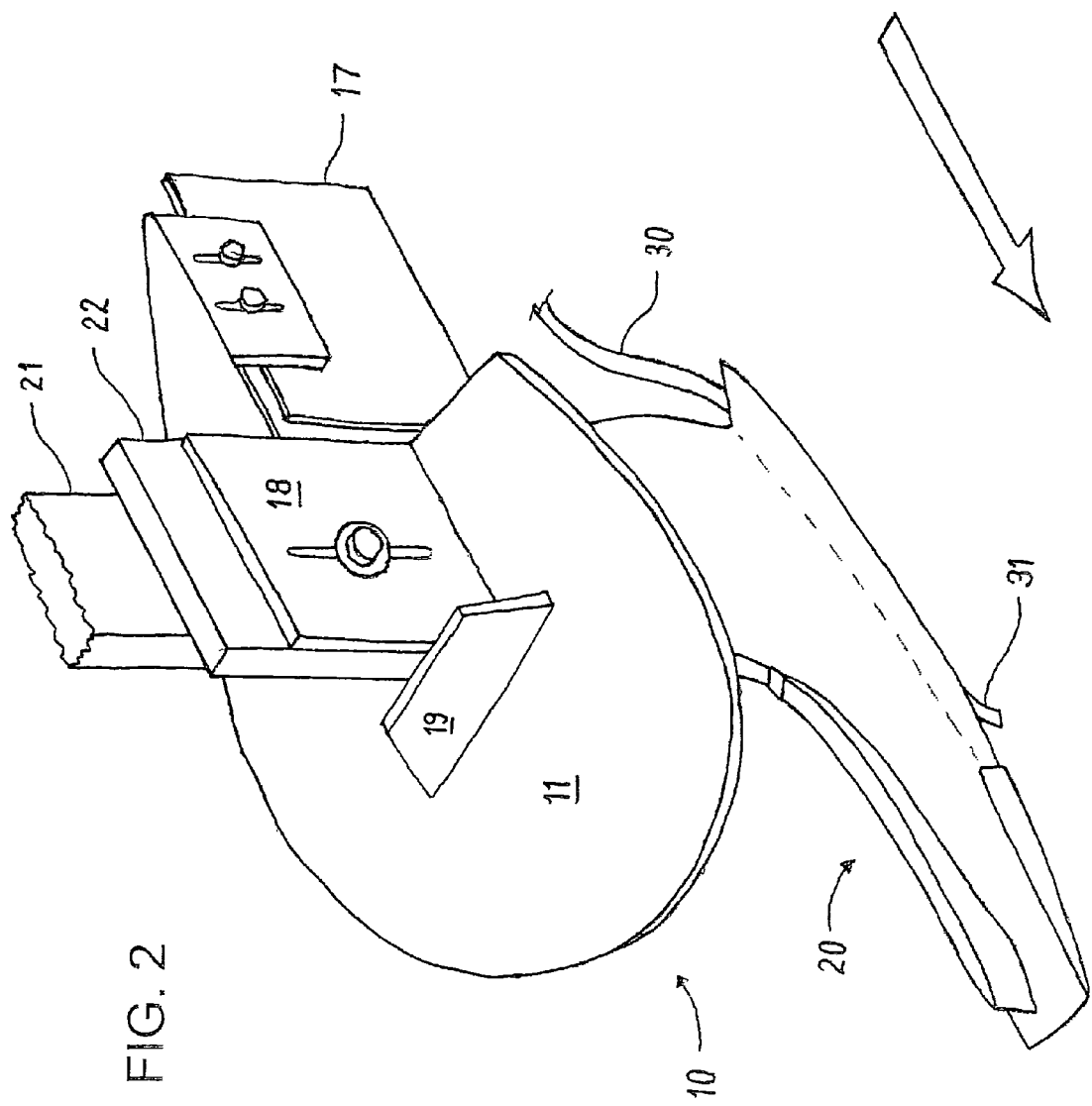
FIG. 2 is a top and front perspective view of the shield attached to an ammonia knife.

The attachment of the shield to an ammonia knife 20 is shown in FIG. 2. A conventional ammonia knife consists of two parts. The upper part 21 of the knife (commonly known as the shank) is attached to the toolbar (not shown) and is generally made of steel. The lower part 22 of the knife (sometimes known simply as the knife) is attached to the upper part with two bolts and is generally made of heat-treated, hardened steel. The lower part of the knife includes the midpoint where the knife is designed to contact the surface of the soil. The knife extends downwardly and forwardly from the midpoint. The lower part of the knife, which is typically curved, contains sharpened leading edges for piercing the ground.

An ammonia supply tube 30 is attached to the knife. The tube has an outlet 31 at the trailing edge of the curving portion of the knife. The vertical flange plate of the shield preferably has mounting slots that enable the shield to be attached using the same fasteners that attach the two parts of the knife together.

The shield is mounted so that the horizontal plate portion is positioned about two to twelve inches above the surface of the soil as the toolbar is dragged through the field. The optimal height is a matter of choice depending on several factors, including the soil type, soil moisture, speed, and the desired depth of penetration of the knife. In most situations, a height of about four to five inches is optimal. The optional moldboard is positioned with its lower edge is closer to the surface, preferably about one inch above the surface.

Figure 3:
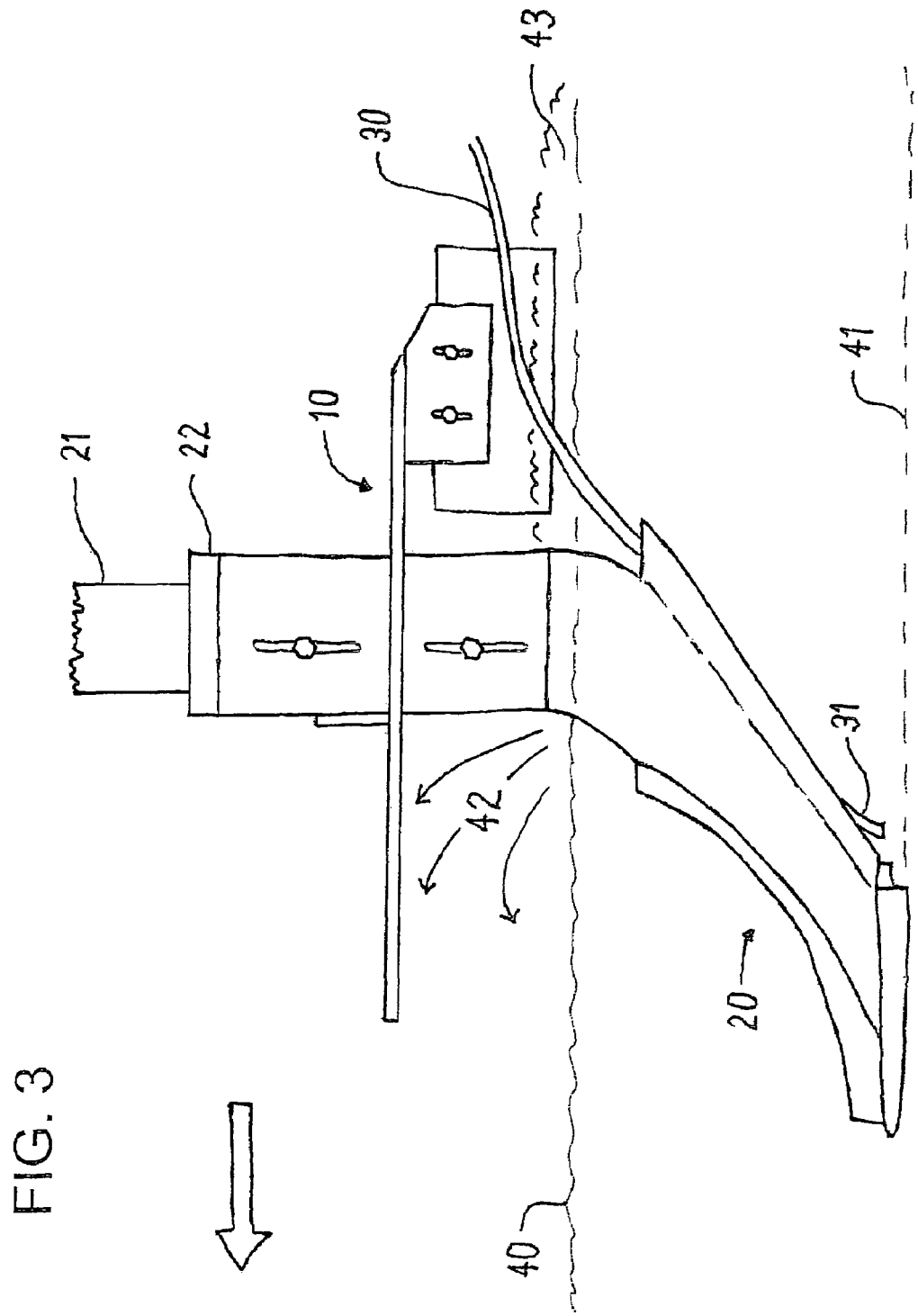
FIG. 3 is a side elevation view of the shield and knife in use.

FIG. 3 is a side elevation view that illustrates the preferred embodiment of the side dressing shield in use. As an ammonia knife is pulled through a field 40, a trench is created into the bottom 41 of which ammonia is applied. The depth of the trench is typically about seven to eight inches. As the midpoint of the ammonia knife contacts the surface of the soil, dirt particles 42 are thrown upward and outward as indicated by the small arrows. The shield deflects any dirt particles that otherwise might land on the corn plants in the adjacent rows. The deflected dirt particles form mounds 43 on both sides of the trench. The closing wing with its rectangular plate closing member sweeps along the mound on one side and fills in the trench.

It can be seen that the height of the horizontal plate above the surface of the soil is adjustable within the range provided by the slots in the flange. It can also be seen that the height of the moldboard is independently adjustable. As previously mentioned, optimal results are obtained with the plate about four to five inches above the surface and the moldboard about one inch above the surface.

Figure 4:
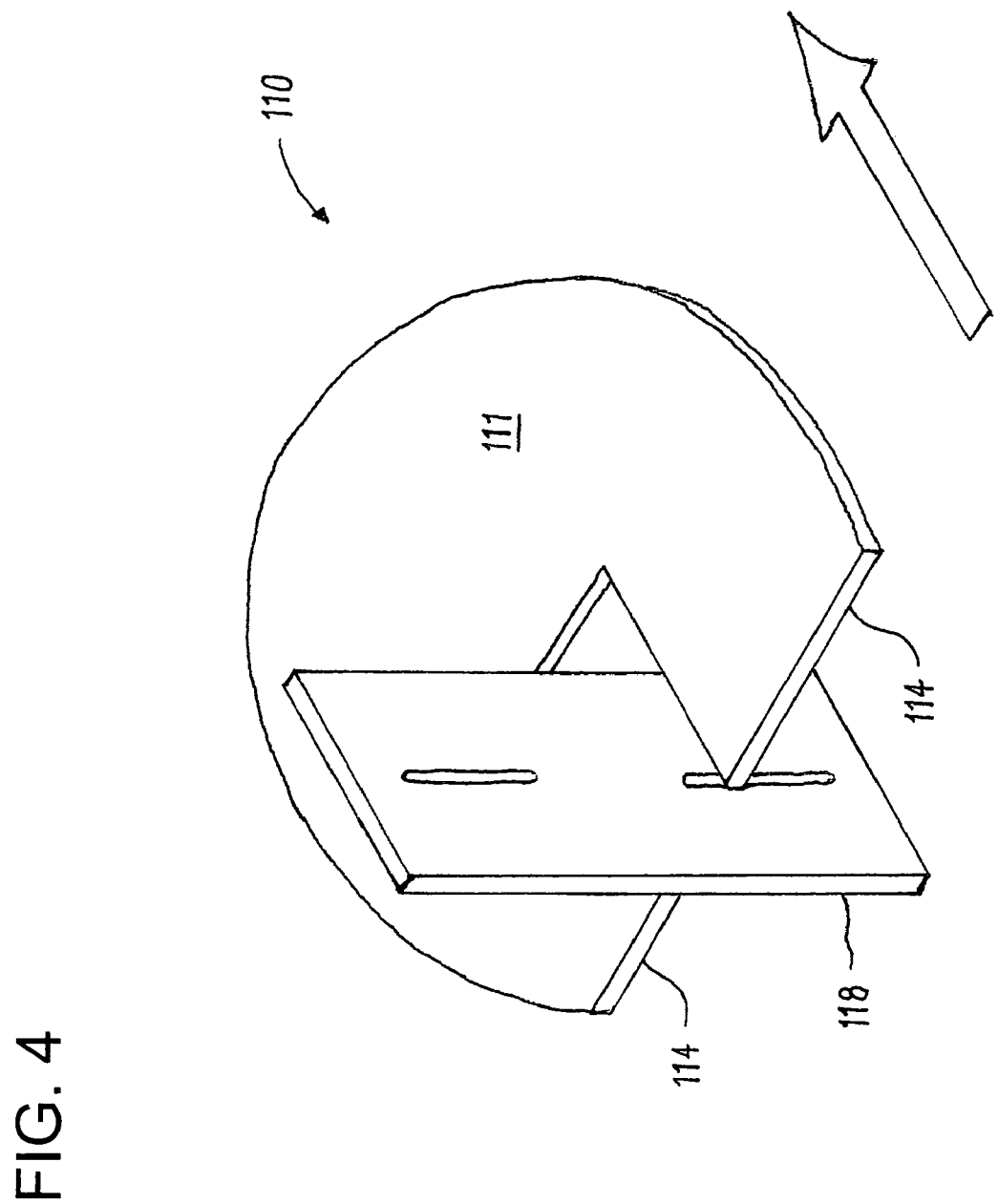
FIG. 4 is a top and rear perspective view of a second embodiment of the side dressing shield of this invention.

A second embodiment of the shield 110, illustrated in FIG. 4, has a flat plate 111, a flange 118, and trailing edges 114 on both sides that terminate at the rear edge of the knife. In other words, it has no closing wings or moldboards. Without a closing wing or moldboard, conventional disc sealers or the like are used to close the trench.

If desired, the shield contains a closing wing and moldboard on both sides of the shield. However, closing wings on both sides create a narrow opening behind the knife and increase the likelihood of field debris being trapped in the opening. A closing wing with a moldboard on one side only (as in the preferred embodiment) is generally sufficient to adequately close the trench.

The side dressing shield of this invention has many advantages. It eliminates or greatly reduces damage to corn plants caused by dirt particles. Accordingly, the side dressing shield eliminates what is otherwise the limiting factor in the speed at which an ammonia toolbar is pulled through a field. With dirt clod damage no longer being the limiting factor, the ammonia toolbar can be pulled at speeds limited only by the ability of the tractor driver to stay in the rows between corn plants and avoid direct damage.

While the shield is primarily intended for use with a ammonia knife in the side dressing application of ammonia to corn fields, the shield is also useful with other implements in other farming steps and with other crops. More particularly, the shield is useful wherever the deflection of dirt particles and/or the closing of a trench is desirable. As one example, the shield is easily mounted to cultivating knives that are commonly used for cultivating various types of crops. As another example, the shield is easily mounted to seed planters.

I claim:

1. An ammonia knife assembly for mounting onto a toolbar for moving across ground having a level in a field and for applying ammonia into a bottom of a trench, the assembly comprising:
   (a) a substantially vertical knife for piercing ground and creating a trench as the knife is pulled across the ground, the knife having a leading edge, a trailing edge, and two sides, the knife further having a midpoint that moves at ground level during use, a forwardly projecting portion below the midpoint that moves below ground level during use, and a mounting portion above the midpoint that moves above ground level during use;
   (b) an ammonia supply tube attached to the knife, the tube having an outlet at the trailing edge of the forwardly projecting portion of the knife for applying ammonia at the bottom of the trench created by the knife; and
   (c) a substantially horizontal shield attached to the knife, the shield positioned about two to twelve inches above the midpoint of the knife, the shield having a rounded portion extending forwardly from the leading edge and two side portions extending outwardly from the sides of the knife and tapering inwardly from front to back for deflecting dirt particles that are thrown upwardly and outwardly from the leading edge of the knife as the knife pierces the ground.

2. The ammonia knife assembly of claim 1 wherein the shield additionally comprises a vertical flange for attachment to the knife.

3. The ammonia knife assembly of claim 2 wherein the shield contains a closing wing on one side for returning the dirt particles into the trench, the closing wing comprising an extension of the shield that extends backwardly behind the knife and an inwardly angled vertical moldboard attached to the extension.

4. A method of side dressing a field containing rows of corn plants with ammonia without causing dirt particle damage to the corn plants, the method comprising dragging a toolbar across ground in the field, the toolbar having a plurality of ammonia knife assemblies, each assembly comprising:
   (a) a substantially vertical knife that pierces unbroken ground and creates a trench as the knife is pulled along the ground, the knife having a leading edge, a trailing edge, and two sides, the knife further having a midpoint that moves at ground level during use, a forwardly curving portion below the midpoint that moves below ground level during use, and a mounting portion above the midpoint that moves above ground level during use;
   (b) an ammonia supply tube attached to the knife, the tube having an outlet at the trailing edge of the forwardly curving portion of the knife that supplies ammonia at the bottom of the trench created by the knife; and
   (c) a substantially horizontal shield attached to the knife, the shield positioned about two to twelve inches above the midpoint of the knife, the shield having a portion extending forwardly from the leading edge and two side portions extending outwardly from the sides of the knife that deflects dirt particles that are thrown upwardly and outwardly from the leading edge of the knife as the knife pierces the unbroken ground.

5. The method of claim 4 wherein forwardly extending portion of the shield is rounded and wherein the side portions of the shield taper inwardly from front to back.

6. The method of claim 5 wherein the shield additionally comprises a vertical flange for attachment to the knife.

7. The method of claim 6 wherein the shield of each ammonia knife assembly contains a closing wing on one side for returning dirt particles into the trench, the closing wing comprising an extension of the shield that extends backwardly beyond the knife and an inwardly angled vertical moldboard attached to the extension.

8. An implement assembly for mounting onto a toolbar for moving across ground having a level in a field and for creating a trench, the assembly comprising:

(a) an implement for piercing ground and creating a trench as the implement is pulled across the ground, the implement having a leading edge, a trailing edge, and two sides, the implement further having a midpoint that moves at ground level during use; and
(b) a substantially horizontal shield attached to the implement, the shield positioned about two to twelve inches above the midpoint of the implement, the shield having a portion extending forwardly from the leading edge and two side portions extending outwardly from the sides of the implement for deflecting dirt particles that are thrown upwardly and outwardly from the leading edge of the implement as it the implement pierces the ground, the shield also having a closing wing for returning dirt particles into the trench, the closing wing comprising an extension of the shield that extends backwardly beyond the implement and an inwardly angled vertical moldboard attached to the extension.

\* \* \* \* \*